United States Patent Office.

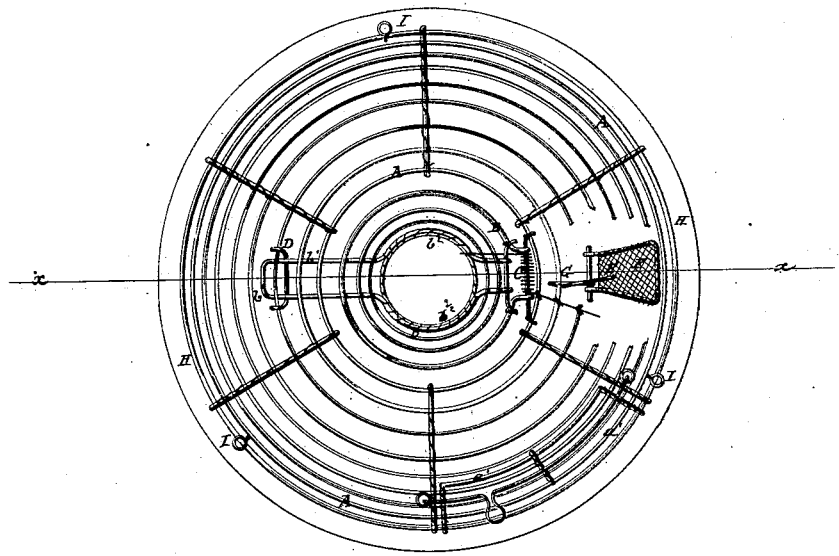

EBENEZER OLIVER, OF NEW YORK, N. Y.

Letters Patent No. 110,065, dated December 13, 1870.

IMPROVEMENT IN ANIMAL-TRAPS.

The Schedule referred to in these Letters Patent and making part of the same.

*To all whom it may concern:*

Be it known that I, EBENEZER OLIVER, of the city, county, and State of New York, have invented a new and useful Improvement in Animal-Trap; and I do hereby declare that the following is a full, clear, and exact description thereof, which will enable others skilled in the art to make and use the same, reference being had to the accompanying drawing forming a part of this specification, in which—

Figure 1 is a top view of my improved trap, part being broken away to show the construction.

Figure 2 is a vertical cross-section of the same, taken through the line $x\ x$, fig. 1, and showing the trap set.

Similar letters of reference indicate corresponding parts.

My invention has for its object to improve the construction of the wire traps known as round or bee-hive traps, so as to make them better adapted for use; and It consists in the construction and combination of various parts of the trap, as hereinafter more fully described.

A is the body of the trap, which is made of wire, in the ordinary form and manner, except that the hole or opening in the top of the trap is made considerably larger.

The hole or opening in the top of the trap is closed by a door, B, which is hinged at one side to the body A, and is so arranged as to open inward, thus leaving the outside of the trap free from projections, and with nothing to alarm the animals or awaken their suspicions.

The door B is provided with a spring, C, so arranged as to raise or close the door B as soon as it may be released from the catch.

Upon the side of the door, opposite its hinge, is formed a projecting loop or arm, $b^1$, which inclines slightly downward, so that, when the said door is raised by the action of the spring C, the loop or arm $b^1$ may strike the swinging loop D, move it back, and pass it. As the loop D swings back to its place it passes beneath the loop $b^1$, so as to support the door B and prevent it from being forced down or open by the weight of an animal standing upon it.

In the center of the door B is formed the ordinary wire tube $b^2$, through which animals seeking to reach the bait may enter the trap when the door B is closed.

E is a small platform, pivoted at one edge to the bottom of the trap.

With the pivoted edge of the platform E is rigidly connected the arm F G, which is so formed as to serve at the same time as a catch, F, for holding the door B open when the trap is set, and as a hook, G, to receive bait.

In setting the trap the loop $b^1$ of the door B is caught upon the catch F of the arm F G, said catch being so formed, as shown in fig. 2, that it may be adjusted to require lesser or greater force to spring the trap.

In the side of the body A of the trap is formed a door, $a'$, for convenience in setting the trap, adjusting the bait upon the hook G, &c.

The body A is secured to the bottom H by wire buttons or hooks, I, pivoted to the said bottom H, and which may be turned over the lower wire of the said body A, thus allowing the body and bottom to be conveniently detached when required. The bottom H may be made of wood, wire, or other suitable material.

The trap may be provided with a wire bail for convenience in carrying it.

In using the trap suitable bait is attached to the bait-hook G, and other bait is scattered about upon the bottom H.

The door B is then caught upon the catch F, and the trap is set, leaving a large opening at the top of the trap for the entrance of the animals, the door seeming to be a means by which they can conveniently escape whenever they may wish to.

As the animals enter the trap they begin to eat the bait upon the bottom H. By and by some of them, seeing the bait upon the hook G, seek to reach it, and in doing so touch the platform E and spring the trap, securing all the animals that may be in it. After the trap has been sprung other animals may enter the trap through the ordinary wire tube $b^2$ and be caught.

Having thus described my invention,

I claim as new and desire to secure by Letters Patent—

1. The door B, constructed to swing inward, and provided with a spring, C, to close it, in combination with the body A of a round wire trap, substantially as herein shown and described, and for the purposes set forth, whether provided with a wire tube, $b^2$, or not.

2. The pivoted platform E, catch F, and bait-hook G, in combination with the spring door B C, substantially as herein shown and described, and for the purpose set forth.

3. The pivoted loop D, in combination with the spring door B C, substantially as herein shown and described, and for the purposes set forth.

4. The combination of the ordinary entrance-tube $b^2$ with the inwardly-swinging spring door B of the trap, substantially as herein shown and described, and for the purpose set forth.

The above specification of my invention signed by me this 7th day of November, 1870.

EBENEZER OLIVER.

Witnesses:
JAMES T. GRAHAM,
T. B. MOSHER.